Oct. 28, 1947.  J. H. HIRSCH  2,429,622
CATALYTIC PRODUCTION OF ETHYL BENZENE
Filed Oct. 28, 1942

INVENTOR
JOEL H. HIRSCH.
BY
ATTORNEY

Patented Oct. 28, 1947

2,429,622

UNITED STATES PATENT OFFICE 2,429,622

CATALYTIC PRODUCTION OF ETHYL BENZENE

Joel H. Hirsch, East Orange, N. J., assignor to Foster Wheeler Corporation, New York, N. Y., a corporation of New York Application October 28, 1942, Serial No. 463,603

6 Claims. (Cl. 260—671)

1

This invention relates to catalytic alkylation and more particularly pertains to benzene alkylation using ethyl alcohol and benzene as the charging stock.

The invention provides an ethyl alcohol process for benzene alkylation, and apparatus for carrying out the process, in which the once-through conversion is substantially greater than has been obtained heretofore in the art.

This is accomplished, in general, by removing from the system the relatively large quantity of water set free when the ethyl alcohol is dehydrated to ethylene. It has been found that high concentrations of water have a deleterious effect on the catalyst with respect to alkylating benzene with ethylene. More specifically, the water is removed at an intermediate point in the system, preferably between reactors, and thus permits high once-through conversion to ethylbenzene which would not be possible if the water remained in the system.

Figure 1:
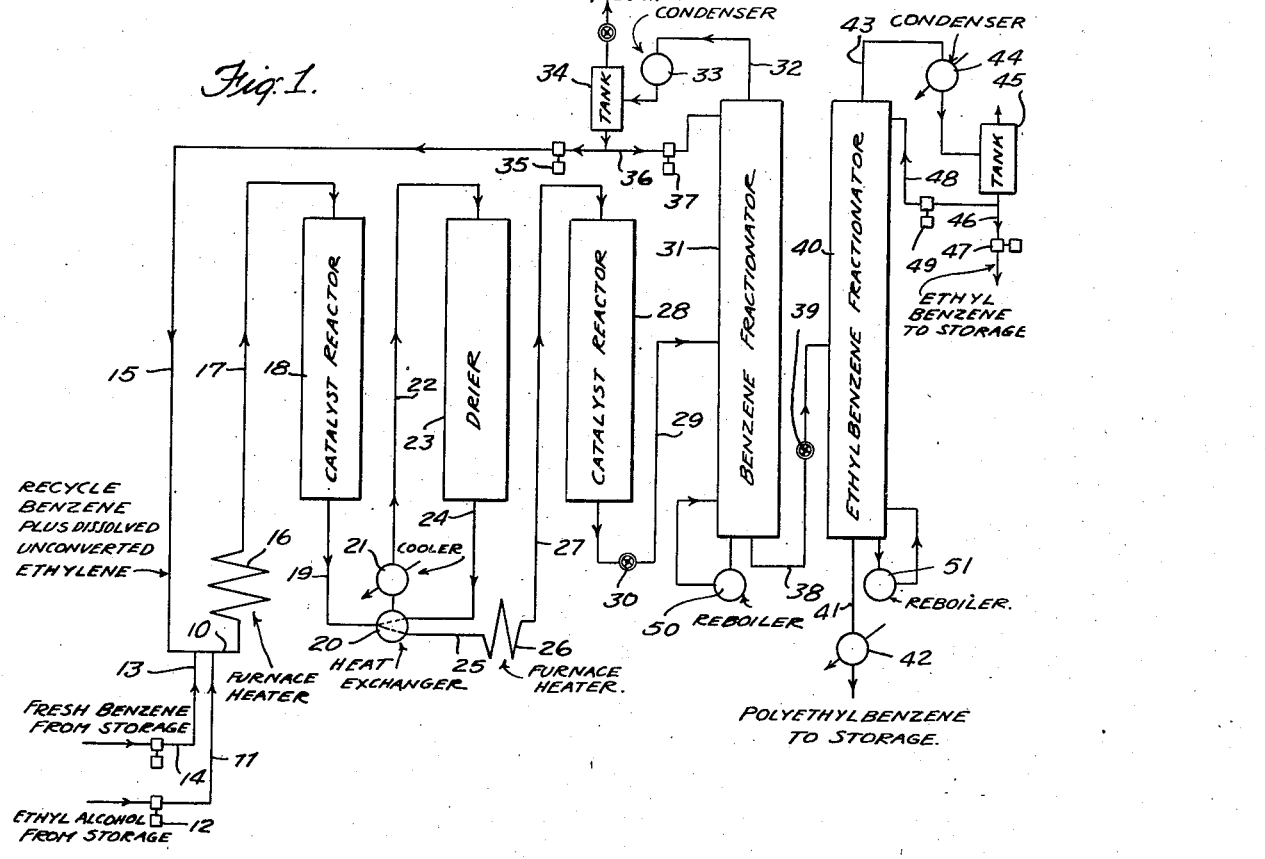
Figure 2:
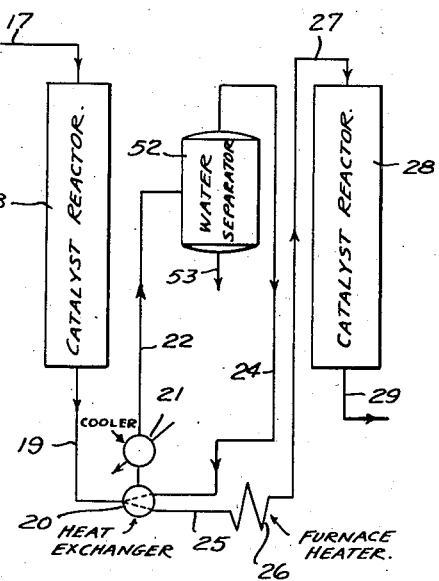

The invention will be understood from the following description when considered in connection with the accompanying drawing forming a part thereof, and in which:

Fig. 1 is a diagrammatic view of apparatus embodying the invention and for carrying out the process of the invention, and Fig. 2 is a partial diagrammatic view of another form of apparatus for carrying out the process.

Like characters of reference refer to the same or to similar parts throughout the several views.

Referring to Fig. 1 of the drawing, ethyl alcohol from storage is delivered to charging line 10 through line 11 by a pump 12, and fresh benzene from storage is also delivered to the charging line through line 13 by a pump 14. Recycle benzene containing any unconverted ethylene in solution is also delivered to the charging line through line 15. This mixture is passed through a furnace heater 16 and thereafter flows through line 17 to a first reactor 18 containing a suitable catalyst such as a phosphoric acid, wherein some alkylation occurs, although the main function is the dehydration of the ethyl alcohol to ethylene and water. The products of reaction are withdrawn from reactor 18 through line 19 and are cooled by passage through a heat exchanger 20 and a cooler 21, after which they flow through a line 22 to a drier 23 containing a suitable drying material, such as calcium chloride, which absorbs substantially all of the water produced in the first reactor 18. The dry effluent flows through line 24 to the heat exchanger 20 wherein it is reheated by heat exchange with the hot effluent from the

2 first reactor 18, and thereafter is conducted through line 25 to a second furnace heater 26 for further heating, after which it flows through line 27 to a second reactor 28 containing a suitable catalyst such as phosphoric acid, and wherein the principal conversion of the ethylene and benzene to ethylbenzene occurs. The second reactor effluent passes through line 29 and a pressure control valve 30 therein, to a benzene fractionator 31 where unconverted benzene and ethylene pass overhead through line 32 and a condenser 33 to a recycle tank 34, from which condensate is pumped through line 15 by pump 35 to the charging line 10, and condensate also is forced through line 36 by pump 37 to the top of the benzene fractionator 31 for reflux. The bottoms from the benzene fractionator 31 pass through line 38 and pressure control valve 39 to an ethylbenzene fractionator 40, and polyethylbenzene is withdrawn through bottoms line 41 and cooler 42 to storage, and ethylbenzene vapors are withdrawn overhead through line 43 and are condensed in condenser 44, the condensate being delivered to a tank 45 from which ethylbenzene is delivered to storage through line 46 by pump 47, and is delivered through line 48 by pump 49 to the top of the ethylbenzene fractionator 40 as reflux. The benzene fractionator 31 is provided with a reboiler 50 and the ethylbenzene fractionator has a reboiler 51.

As shown in Fig. 2, a high pressure water separator 52 may be utilized in lieu of the drier 23 with substantially the same effectiveness and at less expense than the drier. With the separator 52, the operation will be the same as described previously, with separated water being withdrawn from the separator through line 53.

Removal of the comparatively large quantity of water liberated when the ethyl alcohol is dehydrated, makes possible a once-through conversion to ethylbenzene in the ethyl alcohol type of alkylation which has not been accomplished heretofore.

The apparatus and process disclosed, are also applicable to the alkylation of benzene with ethylene to produce ethylbenzene. In such process, instead of using ethyl alcohol, ethylene is obtained or prepared in a preceding process and is charged as a gas to the apparatus. It has been found that when ethylene and benzene are condensed in the presence of catalysts such as phosphoric acid, the once-through conversion is very sensitive to the concentration of water present. For example, if the water concentration of the combined ethylene and benzene feed to the reactor is appreciably above 0.06% by weight of said feed, the once-through conversion falls off markedly from about 80% to 85% conversion at 0.06% by weight of said feed to 60% to 70% conversion as the water concentration approaches 0.5% by weight, all other conditions remaining substantially the same. In the application of this invention to benzene alkylation with ethylene, it is unnecessary to have a reactor precede a drying or water removal step. It has been found that normal benzene feed usually contains about 0.06% or less of moisture at atmospheric temperatures. Normally, this would not be harmful if no other source of moisture were present. However, if the benzene or ethylene should contain more water or moisture than this, so that the combined feed stream contained water in excess of the aforesaid value, it will be desirable to remove this excess of water prior to the reactor. This could be accomplished by including a suitable drier before the furnace heater 16, Fig. 1, in which event only the catalyst reactor 28 would be necessary, and reactor 18, heat exchanger 20, cooler 21 and furnace heater 26 need not be employed.

The embodiments of the invention selected for illustration are preferred forms and changes may be made in the form, location and relative arrangement of the several parts of the apparatus disclosed, and in the sequence of the method steps disclosed, without departing from the principles of the invention. In view thereof, it will be understood that the invention is not to be limited excepting by the scope of the appended claims.

What is claimed is:

1. The method of benzene alkylation using ethyl alcohol and benzene charging stock which includes the steps of passing the charging stock through a dehydration zone where ethylene and water are produced, flowing the products of the reaction in the dehydration zone from the dehydration zone to a water removing zone, removing in the water removing zone water from the products of the reaction in the dehydration zone, and after removal of water in the water removal zone from said products passing the products of the reaction in the dehydration zone including ethylene from the water removal zone into a separate catalytic reaction zone wherein the conversion of ethylene and benzene into ethylbenzene is completed.

2. A once through process for converting ethyl alcohol and benzene to ethylbenzene which includes the steps of introducing ethyl alcohol and benzene into a dehydration zone wherein ethylene and water are produced, flowing the products of the reaction in the dehydration zone from the dehydration zone to a drying zone wherein water is removed from said products of the reaction in the dehydration zone, and thereafter flowing the dried products of the reaction in the dehydration zone including ethylene from the drying zone into a separate catalytic reaction zone wherein the conversion of ethylene and benzene into ethylbenzene is completed.

3. A once through process for converting ethyl alcohol and benzene to ethylbenzene which includes the steps of introducing ethyl alcohol and benzene charging stock into a reaction zone wherein ethylene and water are produced by the dehydration of said ethyl alcohol, passing the products of the reaction in said reaction zone into a water removing zone, removing in said water removing zone water in excess of about 0.06% by weight of said charging stock from the products of the reaction in said reaction zone, and flowing the dried products of the reaction in said reaction zone including ethylene into a catalytic reaction zone wherein ethylene and benzene are converted into ethylbenzene.

4. A once through process for converting ethyl alcohol and benzene to ethylbenzene which includes the steps of introducing ethyl alcohol and benzene charging stock into a reaction zone wherein ethylene and water are produced by the dehydration of said ethyl alcohol, flowing the products of the reaction in said reaction zone into a drying zone wherein water in excess of about 0.06% by weight of said charging stock is removed from the products of the reaction in said reaction zone, flowing the dried products of the reaction in said reaction zone including ethylene into a catalytic reaction zone wherein ethylene and benzene are converted into ethylbenzene, and passing the products of the reaction in said catalytic reaction zone into a fractionating zone wherein the ethylbenzene is separated from said products of the reaction in said catalytic reaction zone.

5. A once through process for converting ethyl alcohol and benzene to ethylbenzene which includes the steps of introducing ethyl alcohol and benzene charging stock into a reaction zone wherein ethylene and water are produced by the dehydration of said ethyl alcohol, flowing the products of the reaction in said reaction zone into a drying zone wherein water in excess of about 0.06% by weight of said charging stock is removed from the products of the reaction in said reaction zone, flowing the dried products of the reaction in said reaction zone including ethylene into a catalytic reaction zone wherein ethylene and benzene are converted into ethylbenzene, passing the products of the reaction in said catalytic reaction zone into a fractionating zone wherein the ethylbenzene is separated from said products of the reaction in said catalytic reaction zone, flowing unconverted products from said fractionating zone into the first mentioned reaction zone, passing the ethylbenzene from said fractionating zone into a second fractionating zone, and separately withdrawing ethylbenzene and polyethylbenzene from said second fractionating zone.

6. A once through process for converting ethyl alcohol and benzene to ethylbenzene which includes the steps of introducing ethyl alcohol and benzene charging stock into a heating zone, passing the heated ethyl alcohol and benzene into a preliminary catalytic reaction zone wherein ethylene and water are produced, flowing the reactants from said preliminary reaction zone into a cooling zone, cooling said reactants in said cooling zone, flowing the cooled reactants from the cooling zone into a drying zone wherein water in excess of about 0.06% by weight of said charging stock is removed from the products of the reaction in said reaction zone, heating the dried reactants from said drying zone, flowing the heated dried reactants of the reaction in the preliminary catalytic reaction zone including ethylene into a principal catalytic reaction zone where ethylene and benzene are converted into ethylbenzene, passing the products of the reaction in said principal catalytic reaction zone into a fractionating zone wherein the ethylbenzene is separated from unconverted products of the reaction in said principal catalytic reaction zone, flowing at least part of said unconverted products from the fractionating zone into the preliminary reacting zone, flowing the separated ethylbenzene from said fractionating zone into a second fractionating zone, and separately withdrawing ethylbenzene and polyethylbenzene from said second fractionating zone.

JOEL H. HIRSCH.

REFERENCES CITED

The following references are of record in the file of this patent:

UNITED STATES PATENTS

| Number | Name | Date |
|---|---|---|
| 2,198,595 | Amos et al. | Apr. 20, 1940 |
| 2,244,512 | Brandt | June 3, 1941 |
| 2,240,160 | Kaplan | Apr. 29, 1941 |
| 2,285,606 | Nofsinger et al. | June 9, 1942 |

FOREIGN PATENTS

| Number | Country | Date |
|---|---|---|
| 317,500 | Great Britain | Aug. 14, 1929 |
| 501,198 | Germany | June 28, 1930 |
| 464,752 | Great Britain | Apr. 19, 1937 |

OTHER REFERENCES

Pages 14 and 15 of "The Oil and Gas Journal" of Aug. 6, 1942. (Copy in Scientific Library.) 260–671.